(12) United States Patent
Mayor et al.

(10) Patent No.: US 8,099,663 B2
(45) Date of Patent: Jan. 17, 2012

(54) APPARATUS AND METHOD FOR DOCUMENT SYNCHRONIZATION

(75) Inventors: Ian Anthony Mayor, Paris (FR); Victor Wai Kit Tang, Kirkland, WA (US)

(73) Assignee: Business Objects Software Ltd., Dublin (IE)

( * ) Notice: Subject to any disclaimer, the term of this patent is extended or adjusted under 35 U.S.C. 154(b) by 1215 days.

(21) Appl. No.: 11/780,436

(22) Filed: Jul. 19, 2007

(65) Prior Publication Data

US 2009/0022312 A1    Jan. 22, 2009

(51) Int. Cl.
*G06F 17/00* (2006.01)
(52) U.S. Cl. ............. 715/242; 715/235; 380/243
(58) Field of Classification Search ........... 715/234–239
See application file for complete search history.

(56) References Cited

U.S. PATENT DOCUMENTS

| 2002/0038319 A1* | 3/2002 | Yahagi | 707/513 |
| 2002/0038320 A1* | 3/2002 | Brook | 707/513 |
| 2004/0103124 A1* | 5/2004 | Kupkova | 707/203 |

* cited by examiner

*Primary Examiner* — Quoc A Tran
(74) *Attorney, Agent, or Firm* — Mintz, Levin, Cohn, Ferris, Glovsky and Popeo, P.C.

(57) ABSTRACT

A computer readable storage medium includes executable instructions to convert a destination document into a destination document tree hierarchy. The destination document tree hierarchy is flattened into a destination document hash table comprising a set of destination document keys and a set of destination document values. A source document is converted into a source document tree hierarchy. The source document tree hierarchy is flattened into a source document hash table comprising a set of source document key-value pairs. A source document key-value pair comprising a key and a value is identified, where the key is not in the set of destination document keys. The source document key-value is added to a changelist. A destination document key is identified, where the destination document key is not a key in a key-value pair in the set of source document key-value pairs. The destination document key is added to the changelist.

19 Claims, 7 Drawing Sheets

| Key | Value |
|---|---|
| LKJSD894IT9 | <serialized Table 1> |
| 498FG9H8SG | <serialized Chart 2> |
| 0FK94DSEJH | <serialized Text 1> |
| HF7934THIG0 | <serialized Cell 1> |
| BNI0QDSMZP | <serialized Cell 2> |
| N923N9F7A1 | <serialized Cell 6> |

FIG. 7B

| Key | Value |
|---|---|
| LKJSD894IT9 | <serialized Table 1> |
| 398JH4IT89G | <serialized Chart 1> |
| 0FK94DSEJH | <serialized Text 1> |
| HF7934THIG0 | <serialized Cell 1> |
| BNI0QDSMZP | <serialized Cell 2> |
| AMABSFBOQ | <serialized Table 2> |
| 9486FHKJGH | <serialized Cell 3> |
| SDFHU8435T | <serialized Cell 4> |
| 32IU3H9DFH | <serialized Cell 5> |

FIG. 7A

APPARATUS AND METHOD FOR DOCUMENT SYNCHRONIZATION

BRIEF DESCRIPTION OF THE INVENTION

This invention relates generally to document synchronization. More particularly, this invention relates to synchronizing documents by updating subsections of documents.

BACKGROUND OF THE INVENTION

Document synchronization in a system via file transfers can be very costly when large documents are being synchronized and/or there is little bandwidth available for data transfer. To reduce the impact of document synchronization, many systems maintain a transaction log recording the changes to each document. When a request is made to synchronize a destination document to a source document, the system simply returns the changes made to the source document since the destination document was last updated. However, this method is still costly in terms of space as an extensive transaction log must be stored.

In view of the foregoing, it would be beneficial to provide a system that compares the source and destination documents to create a transaction log on the fly. This would save on costly document transfers and transaction log storage. One example of where this system would be particularly useful is synchronizing reports in a Business Intelligence system.

Business Intelligence (BI) generally refers to a category of software systems and applications used to improve business enterprise decision-making and governance. These software tools provide techniques for analyzing and leveraging enterprise applications and data. These tools are commonly applied to financial, human resource, marketing, sales, service provision, customer and supplier analyses. More specifically, these tools can include: reporting and analysis tools to analyze, forecast and present information, content delivery infrastructure systems for delivery, storage and management of reports and analytics, data warehousing systems for cleansing and consolidating information from disparate sources, and integration tools to analyze and generate workflows based on enterprise systems. Business Intelligence tools work with data management systems, such as relational databases or On Line Analytic Processing (OLAP) systems used to collect, store, and manage raw data and transactional enterprise systems that generate data. A subset of business intelligence tools are report engines, OLAP systems, Enterprise Information Management (EIM) systems, Extract, Transform Load (ETL) tools, dashboards, and analytics.

There are a number of commercially available products to produce reports from stored data. For instance, Business Objects™, San Jose, Calif., sells a number of widely used report generation products, including Crystal Reports™, Business Objects Voyager™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike, other non-report documents that may optionally import external data within a document, a report document by design is primarily a medium for accessing and, formatting, transforming and or presenting external data.

A report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and metadata).

In contrast to a spreadsheet type application, a report generation tool is generally not limited to a table structure but can support a range of structures, such as sections, cross-tables, synchronized tables, sub-reports, hybrid charts, and the like. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets applications generally work within a looping calculation model, whereas a report generation tools may support a range of calculation models. Although there may be an overlap in the function of a spreadsheet document and a report document, the applications used to generate these documents contain instructions with express different assumptions concerning the existence of an external data source and different logical approaches to interpreting and manipulating imported data.

SUMMARY OF INVENTION

The invention includes a computer readable storage medium with executable instructions to convert a destination document into a destination document tree hierarchy. The destination document tree hierarchy is flattened into a destination document hash table comprising a set of destination document keys and a set of destination document values. A source document is converted into a source document tree hierarchy. The source document tree hierarchy is flattened into a source document hash table comprising a set of source document key-value pairs. A source document key-value pair comprising a key and a value is identified, where the key is not in the set of destination document keys. The source document key-value is added to a changelist. A destination document key is identified, where the destination document key is not a key in a key-value pair in the set of source document key-value pairs. The destination document key is added to the changelist.

BRIEF DESCRIPTION OF THE FIGURES

The invention is more fully appreciated in connection with the following detailed description taken in conjunction with the accompanying drawings, in which:

FIGS. 7A and 7B illustrate destination and source hash tables in accordance with embodiments of the invention.

Like reference numerals refer to corresponding parts throughout the several views of the drawings.

DETAILED DESCRIPTION OF THE INVENTION

The following terminology is used while disclosing embodiments of the invention:

A changelist is a compilation of the differences between two documents. A changelist indicates what changes need to be made to a first document in order to synchronize it with a second document.

A change instruction is a component of a changelist. A change instruction represents a difference between two documents and indicates what action to perform on a destination document in order to synchronize it with a source document. The type of action may be explicitly given along with parameters or may be inferred by the value given.

A source document is a file (e.g., report, text file, spreadsheet, image) that provides updated content to another version of the file (i.e., a destination document) stored in another location on the same machine or on a separate machine.

A destination document is a file (e.g., report, text file, spreadsheet, image) to be synchronized with another version of the file (i.e., a source document) stored in another location on the same machine or on a separate machine.

A document object is a piece of visible content in a document (e.g., a portion of text, a visualization, a header or footer, a table, a table cell, a watermark, or a graphic).

A mobile device is a portable data processor that communicates through a wireless network. Cell phones and Blackberries™ are examples of mobile devices.

A sub-report is a first report linked from within a second report.

Figure 1:
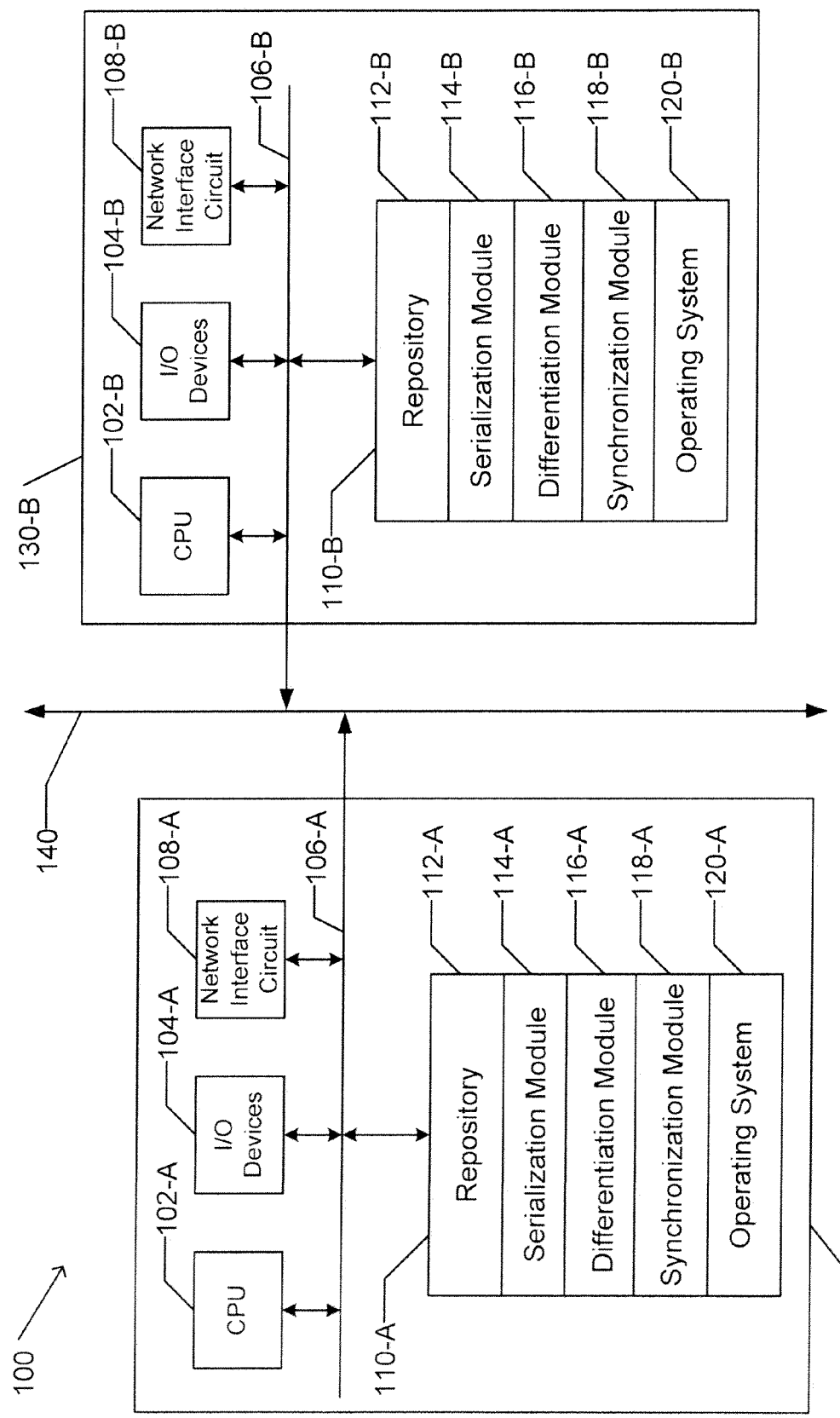
FIG. 1 illustrates a system comprising two or more coupled computers in accordance with an embodiment of the invention.

FIG. 1 illustrates a system 100 configured in accordance with an embodiment of the invention. The system 100 includes two or more coupled computers, e.g., arranged in a client-server architecture. In an embodiment, one of the coupled computers is a mobile device. The system 100 includes a first computer 130-A and a second computer 130-B. A data signal can be sent from the first computer to the second computer and vice versa via communication channel 140, which may be any wired or wireless channel.

Each computer 130 includes a central processing unit 102 connected to a set of input/output devices 104 and a network interface circuit 108 via a bus 106. As shown in FIG. 1, computer 130-A includes a CPU 102-A, input/output devices 104-A, a network connection circuit 108-A and a bus 106-A, while computer 130-B includes a CPU 102-B, input/output devices 104-B, a network interface circuit 108-B and a bus 106-B. For the purpose of simplicity, individual components, e.g., 102-A and 102-B, are collectively referenced only by their number, e.g., 102.

The input/output devices 104 may include standard components, such as a keyboard, mouse, display, printer, and the like. The network interface circuit 108 provides connectivity to communication channel 140.

Also connected to the bus 106 is a memory 110. In an embodiment, the memory 110 stores one or more of the following modules: a repository 112, a serialization module 114, a differentiation module 116, a synchronization module 118 and an operating system module 120.

The repository 112 is a storage location for one or more source or destination documents. The serialization module 114 converts documents into tree hierarchy representations, tree hierarchy representations of documents into hash tables, and deserializes hash tables back into tree hierarchies and tree hierarchies back into documents. In an embodiment, a document is converted into a tree hierarchy by first creating a generic "document" root node, then parsing the document data file. Any entities found are added as child nodes. This is a commonly addressed problem, for example, in converting a document to eXtensible Markup Language (XML), and the solution to this problem is not to be considered a limitation of the invention.

The differentiation module 116 performs comparisons, identifying the differences between the keys of two document hash tables. The synchronization module 118 updates the destination document. The operating system module 120 accepts data selections, retrieves data and may include instructions for handling various system services, such as file services or for performing hardware dependant tasks.

The executable modules stored in memory 110 are exemplary. Additional modules such as a Graphical User Interface (GUI) module can be included. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
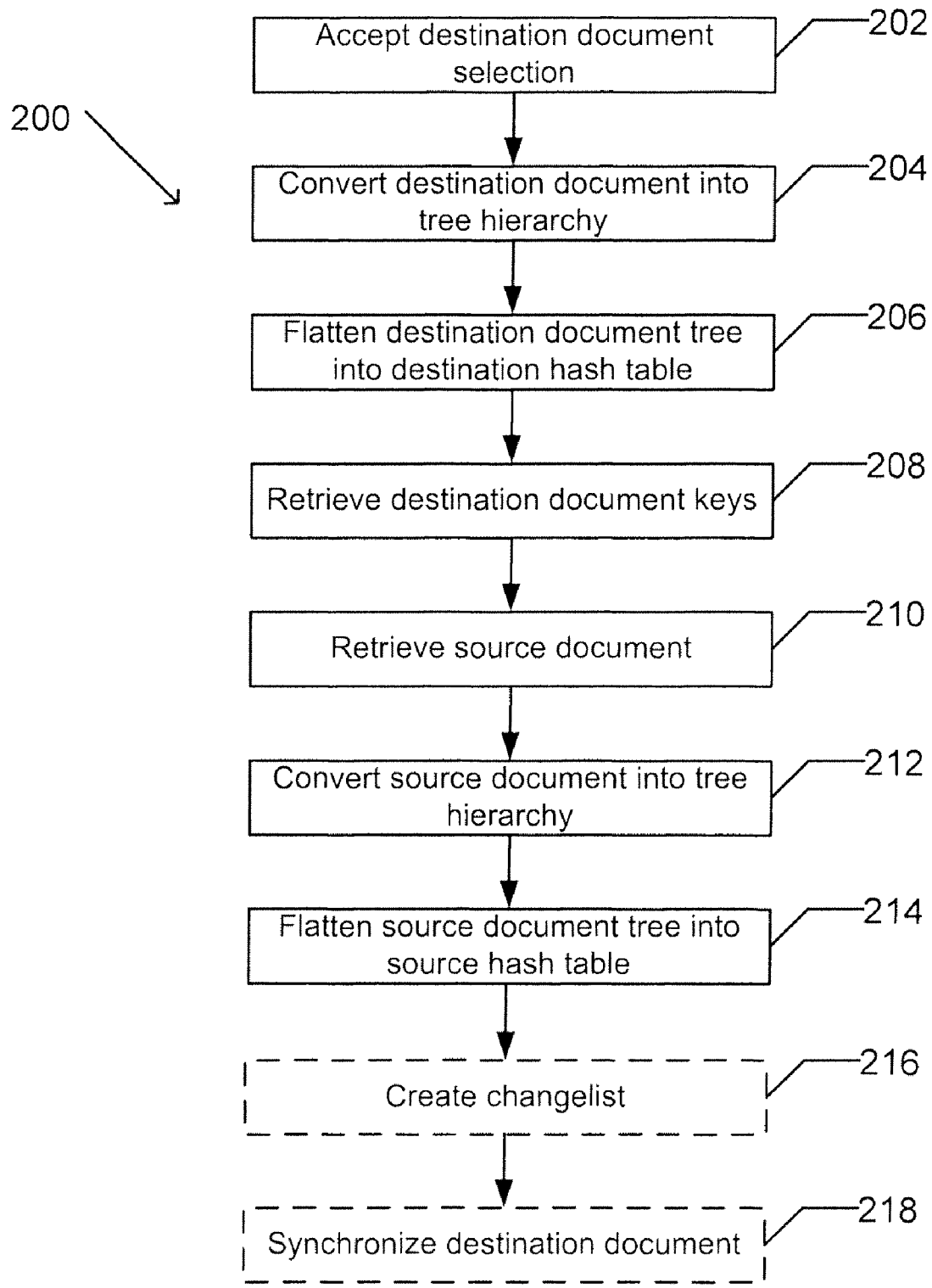
FIG. 2 illustrates processing operations associated with an embodiment of the invention.

FIG. 2 illustrates a series of processing operations 200 that may be implemented by a computer in the system 100 of FIG. 1 in association with an embodiment of the invention. A selection of a destination document 202 is accepted (e.g., by the operating system module 120). The serialization module 114 converts the destination document into a tree hierarchy 204 and flattens, or serializes, the tree into a destination document hash table 206. In an embodiment, a node in the tree represents a document object in the destination document. In an embodiment, a hash table consists of key-value pairs, the value being the serialized version of the document object represented by a tree node and the key being generated by a cryptographic hash function on the value. The differentiation module 116 retrieves the keys of the destination document hash table 208.

The operating system module 120 retrieves the source document 210. In an embodiment, the source document is located on the same machine as the destination document. In an embodiment, the source document is located on a server machine. In an embodiment, the source document is retrieved from the repository 112. The serialization module 114 then converts the source document into a source document tree hierarchy 212 and flattens it into a source document hash table

214. The destination and source keys are compared and a changelist is created 216. The destination document is then synchronized 218.

In an embodiment, the serialization module 114 accepts the destination and source documents in their original file formats, using a plug-in to convert the file format to a tree hierarchy. In an embodiment, the destination and source documents are stored in their tree hierarchy representations. In an embodiment, the destination hash table is passed to the serialization module 114 and consequently, does not need to be calculated. The keys are passed directly to the differentiation module 116 for comparison with the source hash table.

Figure 3:
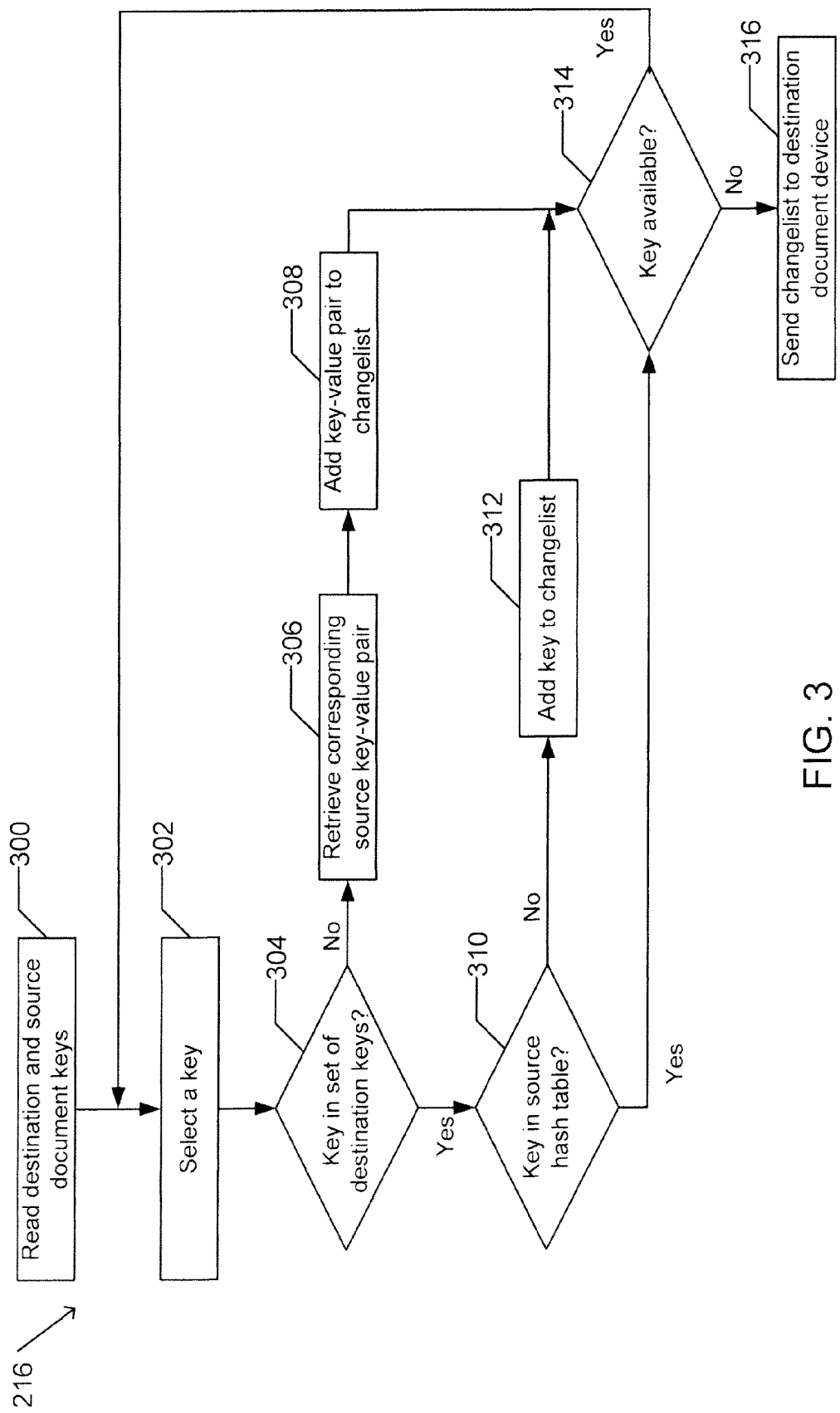
FIG. 3 illustrates processing operations for creating a changelist in accordance with an embodiment of the invention.

FIG. 3 illustrates the sub-process of creating a changelist 216 of FIG. 2 in association with an embodiment of the invention. The differentiation module 116 reads in the destination document keys and the keys from the source document hash table 300, and selects a key 302. The differentiation module 116 then determines if the key is in the set of destination document keys 304. If the key is not in the set of destination document keys, 304—No, the differentiation module 116 retrieves the corresponding key-value pair from the source hash table 306. The differentiation module 116 then adds the key-value pair to the changelist 308. The differentiation module 116 then checks for another key 314. If there is another key, 314—Yes, control returns to block 302. If there is not another key, 314—No, then the differentiation module 116 passes the completed changelist to the synchronization module 118 on the device that the destination document resides on 316.

If the key is in the set of destination document keys, 304—Yes, then the differentiation module 116 checks if the key is in the source hash table 310. If the key is not in the source hash table, 310—No, then the differentiation module 116 adds the key to the changelist 312 and the differentiation module 116 checks for another key 314.

If the key is in the set of destination document keys, 304—Yes, and in the source hash table, 310—Yes, then the key is ignored and the differentiation module 116 checks for another key 314.

Figure 4:
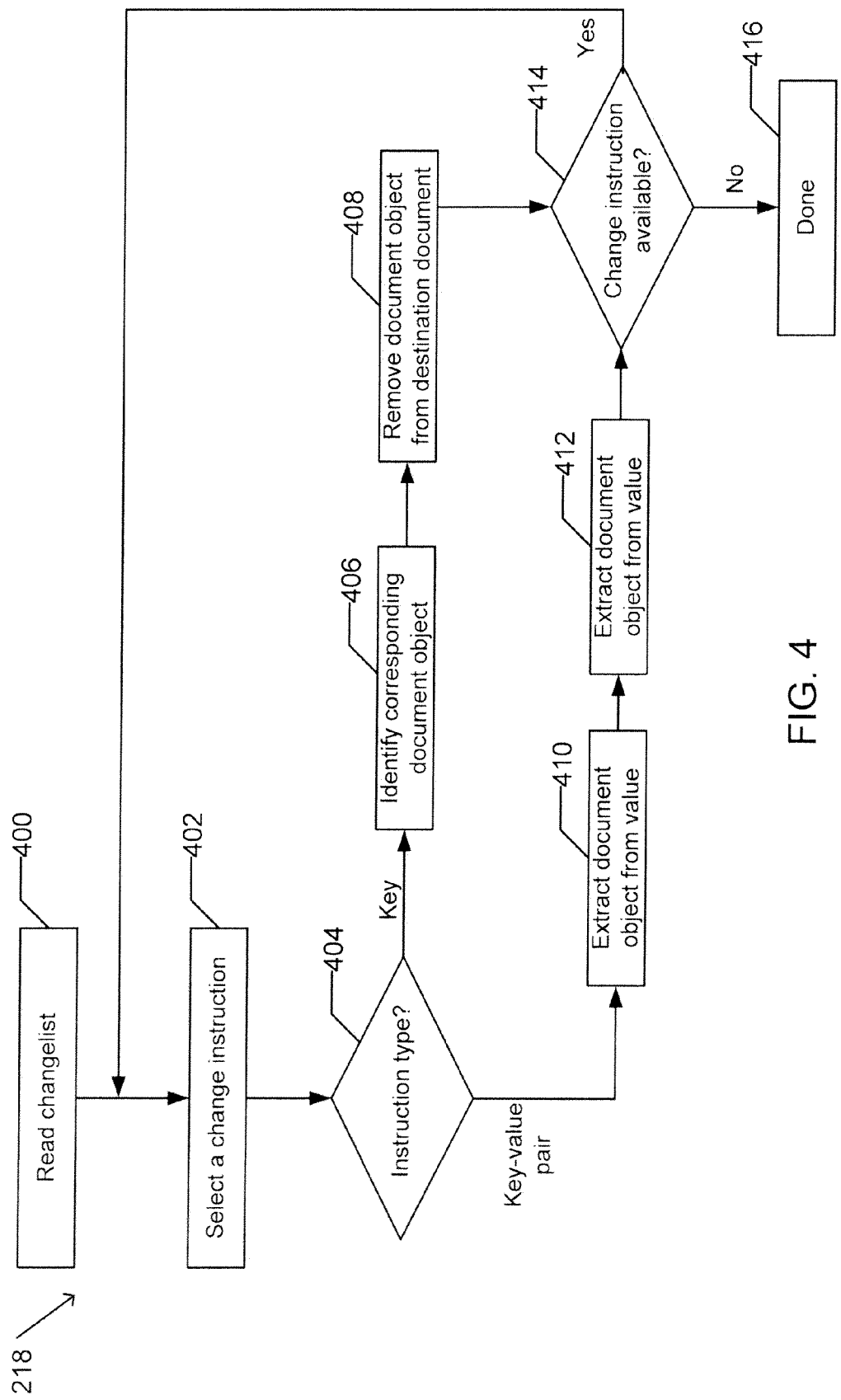
FIG. 4 illustrates processing operations for synchronizing a document in accordance with an embodiment of the invention.

FIG. 4 illustrates the sub-process of synchronizing a destination document 218 of FIG. 2 in association with an embodiment of the invention. First, the synchronization module 118 reads in the changelist 400 and selects a change instruction 402. In an embodiment, a change instruction is either a key or key-value pair. Keys indicate document objects to be deleted from a document, and key-value pairs specify document objects to be added. In an embodiment, a change instruction provides an action (e.g., add, delete) and a parameter for that action (e.g., key, key-value pair). The synchronization module 118 checks the change instruction type 404. If the change instruction is a key, 404—Key, then the synchronization module identifies the document object corresponding to the node in the destination document tree hierarchy that is related to the key 406. The synchronization module removes the document object from the destination document 408 and checks for another change instruction 414. If another instruction is available, 414—Yes, control returns to block 402. If there are no more change instructions available, 414—No, the process is complete 416. When the synchronization module 118 checks the change instruction type 404, if the instruction is a key-value pair, 404—Key-value pair, then the document object is extracted from the value 410 and added to the destination document 412.

Figure 5:
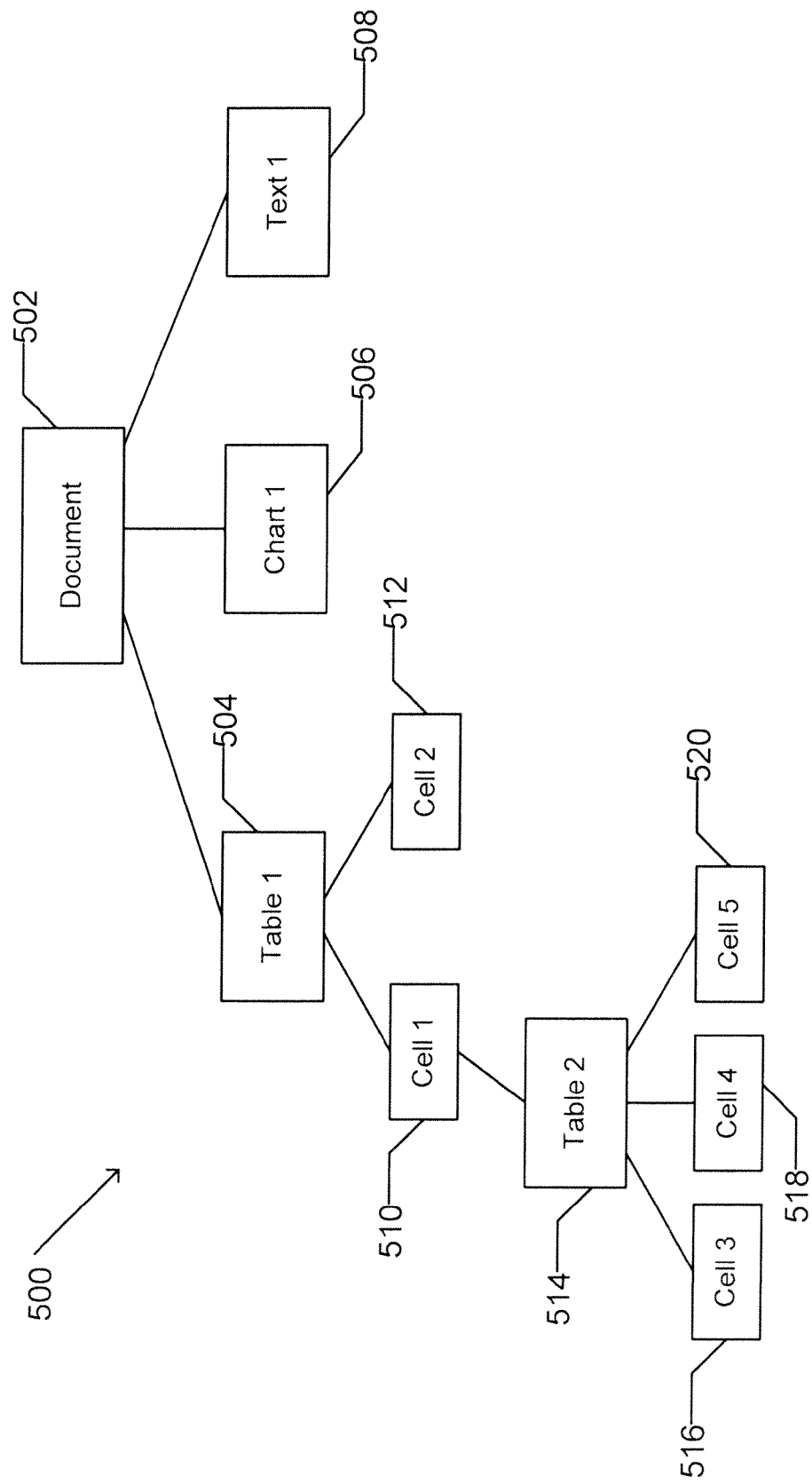
FIG. 5 illustrates a destination document tree hierarchy configured in accordance with an embodiment of the invention.

FIG. 5 illustrates a destination document tree hierarchy 500 associated with an embodiment of the invention. The tree hierarchy 500 comprises the document objects of the destination document in the form of tree nodes. In an embodiment, tree nodes may represent any type of document object (e.g., a portion of text, a visualization, a header or footer, a table, a table cell, a watermark, a graphic). The root node 502 represents the document and the child nodes 504-520 represent the document objects of the document. In an embodiment, related document objects are represented in a hierarchy, such as Table 1 504 and Cell 1 510 and Cell 2 512. The structure of the example tree hierarchy 500 illustrates that the Table 1 504 contains the cells Cell 1 510 and Cell 2 512. The Cell 1 510 contains Table 2 514, which contains the cells Cell 3 516, Cell 4 518 and Cell 5 520.

Figure 6:
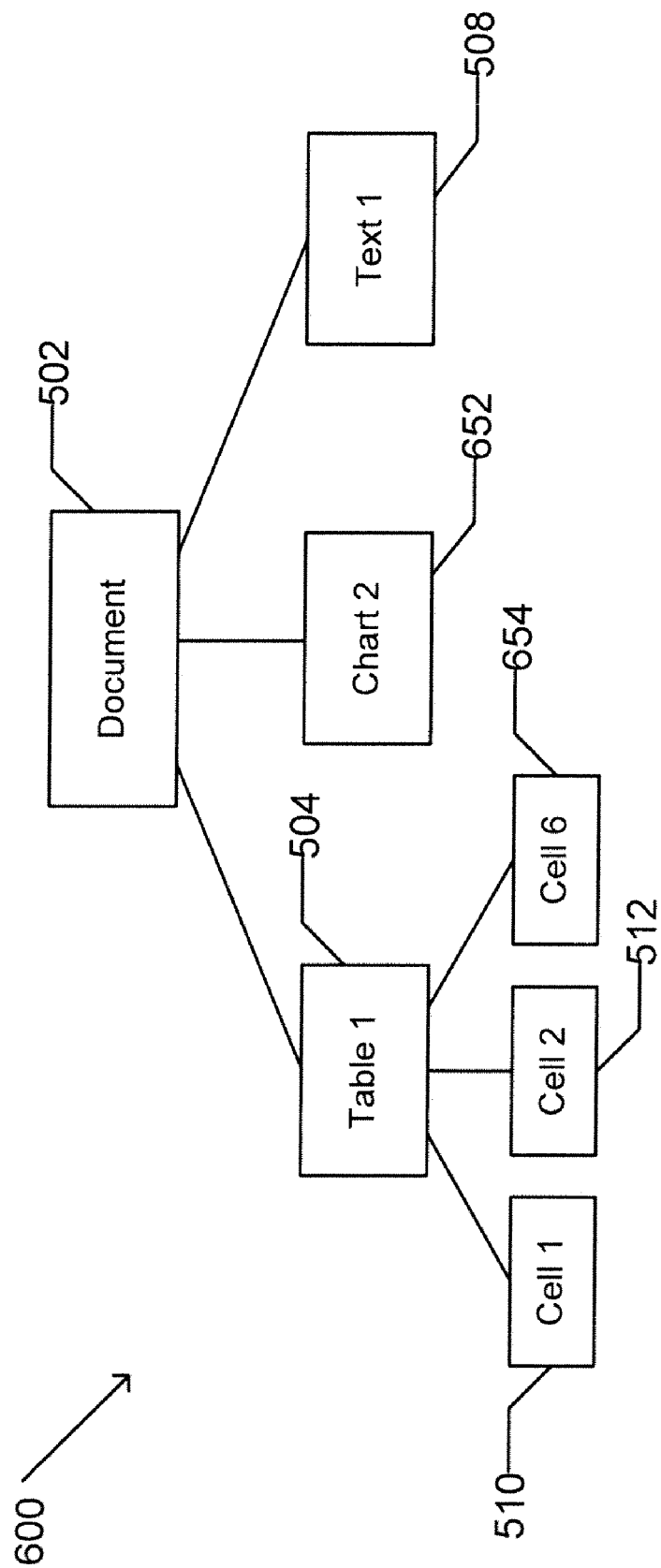
FIG. 6 illustrates a source document tree hierarchy configured in accordance with an embodiment of the invention.

FIG. 6 illustrates a source document tree hierarchy 600 that represents an updated version of the destination document represented by the tree hierarchy 500 in FIG. 5 associated with an embodiment of the invention. The nodes Table 1 504, Text 1 508, Cell 1 510 and Cell 2 512 of FIG. 6 represent the same document objects as those represented by the similarly numbered nodes of FIG. 5. The node Chart 2 652 represents an updated version of the node Chart 1 506 of FIG. 5 and the node Cell 6 654 represents a new document object that has been added to the Table 1 504. In an embodiment, a document object is updated with one or more of new content, formatting or location.

FIGS. 7A and 7B illustrate the hash tables 700 and 750 serialized from the trees 500 of FIG. 5 and 600 of FIG. 6 respectively in accordance with an embodiment of the invention. In an embodiment of the invention, a document object represented by a tree node is serialized to form a hash table value and a hash table key is generated from the resulting value. The key-value pairs 704A, 708A, 710A and 712A of FIG. 7A correspond to the key-value pairs 704B, 708B, 710B and 712B of FIG. 7B, and represent the document objects that are common between the destination document and source document. The keys and values of the key-value pairs 704, 708, 710 and 712 are the same in FIGS. 7A and 7B. The key-value pairs 706, 714, 716, 718 and 720 of FIG. 7A represent the document objects of the destination document that do not appear in the same form in the source document. The key-value pairs 752 and 754 of FIG. 7B represent the document objects in the source document that do not appear in the same form in the destination document. An example of the changelist created in differentiating the destination and source documents associated with the hash tables 700 and 750 is as follows:

```
Delete, 398JH4IT89G
Delete, AMABSFBOQ
Delete, 9486FHKJGH
Delete, SDFHU8435T
Delete, 32IU3H9DFH
Add, < 498FG9H8SG, <serialized Chart 2>>
Add, < N923N9F7A1, <serialized Cell 6>>
```

In an embodiment, after synchronization, the destination document hash table 700 is identical to the source document hash table 750.

In an embodiment, the source document is stored on a server machine and the destination document is stored on a local machine. In an embodiment, the destination document is stored on a server machine and the source document is stored on a local machine. In an embodiment, one of the source and the destination document is stored on a mobile device.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   accept a selection of a destination document on a client device;
   convert the destination document into a destination document tree hierarchy;
   flatten the destination document tree hierarchy into a destination document hash table, comprising a set of destination document keys and a set of destination document values;
   retrieve the set of destination document keys from the client device;
   retrieve a source document, wherein the source document is a second version of the destination document, from a server device;
   convert the source document into a source document tree hierarchy;
   flatten the source document tree hierarchy into a source document hash table, comprising a set of source document key-value pairs;
   identify a source document key-value pair, comprising a key and a value, wherein the key is not in the set of destination document keys;
   add the source document key-value to a changelist;
   identify a destination document key, wherein the destination document key is not a key in a key-value pair in the set of source document key-value pairs; and
   add the destination document key to the changelist; and
   send the changelist to the client device.

2. The computer readable storage medium of claim 1, wherein a key is generated using a cryptographic hash function on document object content selected from two or more of value, location within a document, formatting, data source, language specification, and data context.

3. The computer readable storage medium of claim 1, wherein a node in a tree hierarchy representation of a document represents a document object.

4. The computer readable storage medium of claim 3, wherein a key is associated with a node in a tree hierarchy and the node represents a document object corresponding to the key.

5. The computer readable storage medium of claim 4, further comprising executable instructions to:
   read a destination document key from the changelist;
   identify a node in the destination document tree hierarchy that is associated with the destination document key; and
   remove the destination document object represented by the node from the destination document.

6. The computer readable storage medium of claim 3, wherein a document object is selected from one of a table, a table cell, a visualization, a graphic, a watermark, a header, a footer, a portion of text, an image, a sub-report, and a link.

7. The computer readable storage medium of claim 1, further comprising executable instructions to:
   read a source document key-value pair, comprising a source document key and a source document value, from the changelist;
   extract a source document object from the source document value; and add the source document object to the destination document.

8. The computer readable storage medium of claim 1, wherein a document tree hierarchy is a generic document representation.

9. The computer readable storage medium of claim 1, wherein the destination document is selected by a user.

10. A method for implementation by one or more data processors comprising:
    accepting a selection of a destination document on a client device;
    converting the destination document into a destination document tree hierarchy;
    flattening the destination document tree hierarchy into a destination document hash table, comprising a set of destination document keys and a set of destination document values;
    retrieving the set of destination document keys from the client device;
    retrieving a source document, wherein the source document is a second version of the destination document, from a server device;
    converting the source document into a source document tree hierarchy;
    flattening the source document tree hierarchy into a source document hash table, comprising a set of source document key-value pairs;
    identifying a source document key-value pair, comprising a key and a value, wherein the key is not in the set of destination document keys;
    adding the source document key-value to a changelist;
    identifying a destination document key, wherein the destination document key is not a key in a key-value pair in the set of source document key-value pairs; and
    adding the destination document key to the changelist; and
    sending the changelist to the client device.

11. The method of claim 10, wherein a key is generated using a cryptographic hash function on document object content selected from two or more of value, location within a document, formatting, data source, language specification, and data context.

12. The method of claim 10, wherein a node in a tree hierarchy representation of a document represents a document object.

13. The method of claim 12, wherein a key is associated with a node in the tree hierarchy and the node represents a document object corresponding to the key.

14. The method of claim 13, further comprising:
   read a destination document key from the changelist;
   identify a node in the destination document tree hierarchy that is associated with the destination document key; and
   remove the destination document object represented by the node from the destination document.

15. The method of claim 12, wherein a document object is selected from one of a table, a table cell, a visualization, a graphic, a watermark, a header, a footer, a portion of text, an image, a sub-report, and a link.

16. The method of claim 10, further comprising:
   read a source document key-value pair, comprising a source document key and a source document value, from the changelist;
   extract a source document object from the source document value; and add the source document object to the destination document.

17. The method of claim 10, wherein a document tree hierarchy is a generic document representation.

18. The method of claim 10, wherein the destination document is selected by a user.

19. A non-transitory computer readable storage medium, comprising executable instructions to:
   convert a destination document into a destination document tree hierarchy;
   flatten the destination document tree hierarchy into a destination document hash table, comprising a set of destination document keys and a set of destination document values;
   convert a source document into a source document tree hierarchy;
   flatten the source document tree hierarchy into a source document hash table, comprising a set of source document key-value pairs;
   identify a source document key-value pair, comprising a key and a value, wherein the key is not in the set of destination document keys;
   add the source document key-value to a changelist;
   identify a destination document key, wherein the destination document key is not a key in a key-value pair in the set of source document key-value pairs; and
   add the destination document key to the changelist;
   wherein each key is based on a document object, each document object being a piece of visible content in a document.

* * * * *